United States Patent [19]
Tsuji et al.

[11] 4,433,409
[45] Feb. 21, 1984

[54] PICK-UP ASSEMBLY FOR VIDEO DISC PLAYER

[75] Inventors: Mahito Tsuji, Yawata; Toshiyuki Kudo, Hirakata; Kazuo Itoh, Matsubara, all of Japan

[73] Assignee: Sanyo Electric Co., Ltd., Osaka, Japan

[21] Appl. No.: 357,322

[22] Filed: Mar. 11, 1982

[30] Foreign Application Priority Data

Mar. 13, 1981 [JP] Japan ............................ 56-35884[U]

[51] Int. Cl.³ .............................................. G11B 17/06
[52] U.S. Cl. ................................. 369/170; 29/25.41; 29/854; 369/126; 369/151
[58] Field of Search ..................... 29/25.42, 854, 857, 29/860; 369/170, 171, 172, 173, 126, 151

[56] References Cited
U.S. PATENT DOCUMENTS 4,113,981 9/1978 Fujita ..................................... 374/88
4,337,536 6/1982 Taylor ................................. 369/126

Primary Examiner—Steven L. Stephan
Attorney, Agent, or Firm—Armstrong, Nikaido, Marmelstein & Kubovcik

[57] ABSTRACT

A pick-up assembly for use in a video disc player comprises a stylus having one lengthwise surface provided with an electrode and secured to a stylus carrier with the electrode facing in a direction away from the carrier, and a generally strip-shaped fly lead having one end bent and connected physically and electrically to the electrode by the use of an electroconductive bonding agent, thereby minimizing the required length of the expensive stylus and rendering to decrease the noise of the pick-up assembly.

5 Claims, 11 Drawing Figures

4,433,409

PICK-UP ASSEMBLY FOR VIDEO DISC PLAYER

BACKGROUND OF THE INVENTION

The present invention generally relates to a pick-up assembly for use in a video disc player and, more particularly, to an improvement in a fly lead used in the pick-up assembly for providing a signal transmission line and also a support for the pick-up stylus relative to the displacement in a direction laterally of and/or perpendicular to a video disc placed on a turntable.

As is well known to those skilled in the art, a video disc player of the CED system utilizes a pick-up assembly generally of a construction shown in FIG. 1 of the accompanying drawings. Referring to FIG. 1, the pick-up assembly comprises a generally rectangular casing 1, a cantilever 2 having one end connected to the casing 1 in a known manner, a stylus carrier 3 carried by the opposite end of the cantilever 2, a stylus 4 generally made of diamond and mounted on the carrier 3 so as to extend generally at right angle to the carrier 3 and a fly lead 5 made of electroconductive and resilient material and serving concurrently as a signal transmission line through which a video signal picked up by the stylus 4 from a video disc is transmitted to an external electrical circuit and as a support for the stylus 4 relative to the displacement in a direction laterally of and/or perpendicular to the video disc on a turntable. According to the prior art, in order to assuredly connect the fly lead 5 to one end of the diamond stylus 4 opposite to its pointed end, the diamond stylus 4 has a relatively great length $l_1$ so that that end of the stylus 4 opposite to its pointed end can project beyond the stylus carrier 3 a length c which corresponds to the balance of the length $l_1$ less the sum of the length b over which the pointed end of the stylus 4 extends downwards from the carrier 3 and the length a of a generally intermediate portion of the stylus 4 which extends across the thickness of the carrier 3, as shown in FIG. 2. In this known construction, the greater the length c, the easier it is to connect the fly lead to the stylus. However, the greater the overall length of the stylus, the higher the manufacturing cost of the pick-up assembly. This is because the diamond is the most expensive material for the sytlus. Examples of the above discussed prior art are found in, for instance, the Japanese Laid-open Patent Publication No. 52-37004 (laid open to public inspection on Mar. 22, 1977) and No. 56-119950 (laid open to public inspection on Sept. 19, 1981, and corresponding to the U.S. patent application No. 118240 filed Feb. 4, 1980 in U.S.A.).

In order to minimize the manufacturing cost without reducing the rigidity of connection of the fly lead to the diamond stylus, the Japanese Laid-open Utility Model Application No. 56-90747 (filed by the assignee of the present invention on Dec. 14, 1979 and laid open to public inspection on June 14, 1981) discloses such an arrangement such as that shown in FIG. 3. Referring to FIG. 3, the stylus carrier 3' has an inclined face 6 on which a projection 7 is rigidly mounted. The stylus carrier 3' also has an upright end face 8 continued to the inclined face 6, the stylus 4' being rigidly secured to the upright end face 8 without permitting one end of the stylus 4' opposite to the pointed end to project upwardly beyond the upright end face 8. One end of the fly lead 5' is positioned on the inclined face 6 with the projection 7 extending therethrough and is electrically connected to the stylus 4' through a continuous electroconductive layer 9 deposited on the faces 6 and 8.

The arrangement shown in FIG. 3 requires the employment of an electrodeposition of an electroconductive material to form the layer 9 over a relatively large surface area ranging from the end face 8 to the inclined face 6, and accordingly, the cost required to perform the electrodeposition reflects upon the price of the resultant pick-up assembly, rendering the cost of the latter comparable to that of the pick-up assembly of FIG. 2, even though the required length $l_2$ of the stylus is smaller than that shown in FIG. 2.

Accordingly, the present invention has been developed with a view to substantially eliminating the disadvantages and inconveniences inherent in the prior art and proposed pick-up assemblies and has for its essential object to provide an improved pick-up assembly for a video disc player, which utilizes a stylus of relatively small length, which can be manufactured at reduced cost without employing the expensive electro-deposition technique, and of which characteristics can be improved with decreasing the noise in operation.

According to the present invention, the above described object of the present invention can be advantageously and effectively accomplished by providing an improved pick-up assembly which comprises a generally elongated stylus of generally rectangular cross section and having an electrode provided on one surface of said stylus so as to extend lengthwise thereof, a generally elongated stylus carrier having first and second support faces defined at one end thereof so as to lie at right angles to each other, said stylus being secured to said first and second support faces with said one surface of said stylus facing in a direction away from said carrier, said stylus so secured extending generally transversely of the longitudinal axis of the carrier, and a generally strip-shaped resilient fly lead having one end bent to protrude generally perpendicular to the remaining portion thereof, said bent end being physically and electrically connected to the electrode by the use of an electroconductive bonding agent.

These and other objects and features of the present invention will become readily understood from the following detailed description made in connection with a preferred embodiment thereof with reference to the accompanying drawings, in which;

DETAILED DESCRIPTION OF THE INVENTION

Figure 5A:
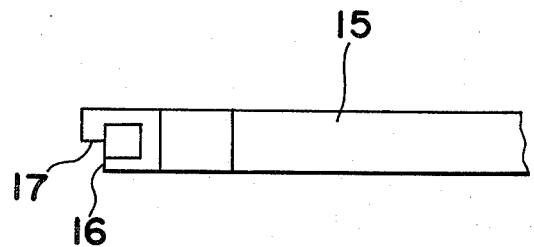
FIGS. 5(a), 5(b) and 5(c) are top plan, side and front elevational views, respectively, of the stylus carrier used in the pick-up assembly of the present invention.
Figure 5C:
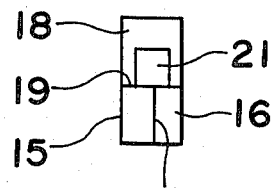
Figure 5B:
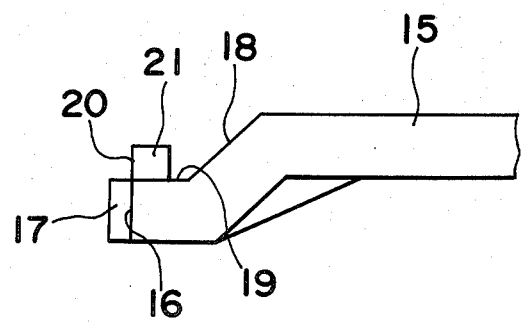
Figure 6:
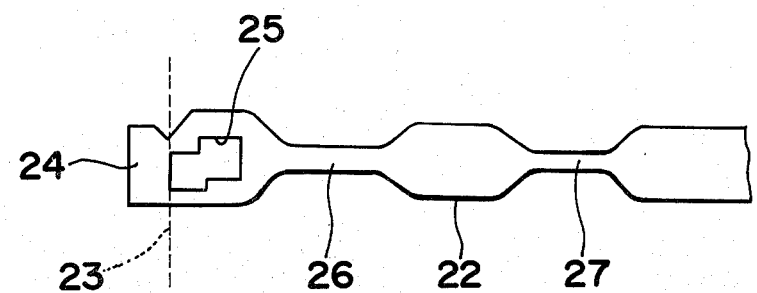
FIG. 6 is a plan view of a fly lead used in the pick-up assembly of the present invention, which fly lead is shown as developed in a single plane.

Before the description of the present invention proceeds, it is to be noted that like parts are designated by like reference numerals throughout FIG. 4 to FIG. 6. It is also to be noted that, since a general structure of the pick-up assembly embodying the present invention may be of any known construction such as shown in FIG. 1, and since the concept of the present invention is directed to the connection of the stylus to the fly lead at one end of the stylus carrier, the present invention will be described in connection with only the relevant portion of the pick-up assembly for the sake of brevity.

Figure 4A:
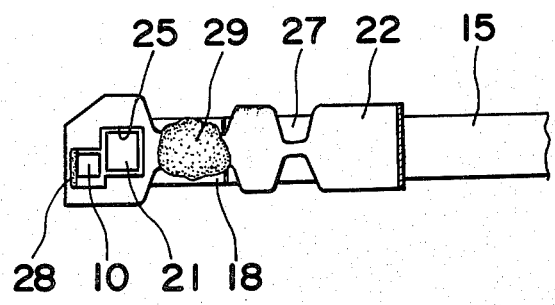
FIG. 4(a) is a top plan view of an essential portion of a stylus carrier embodying the present invention.
Figure 4B:
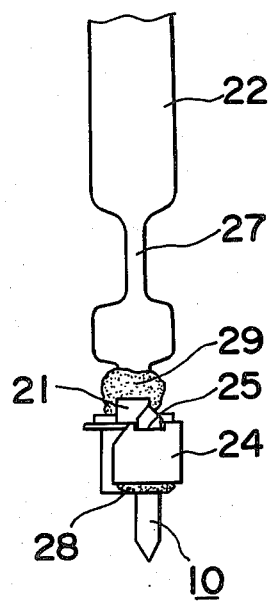
FIG. 4(b) is a front elevational view of FIG. 4(a)
Figure 4C:
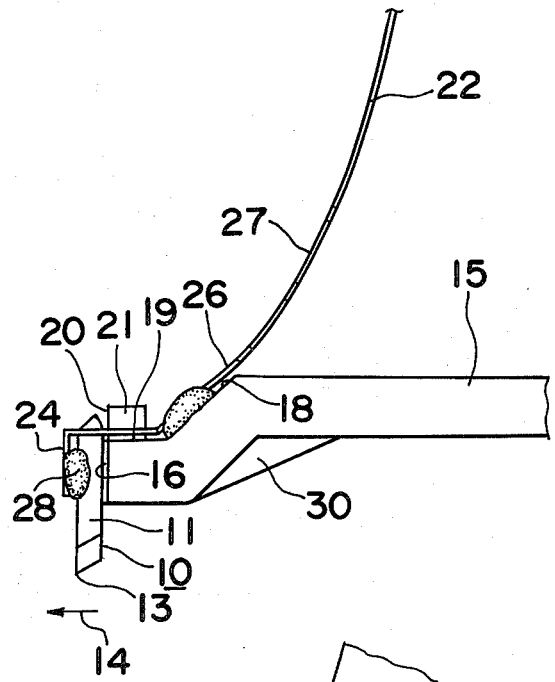
FIG. 4(c) is a side view of FIG. 4(a)
Figure 4D:
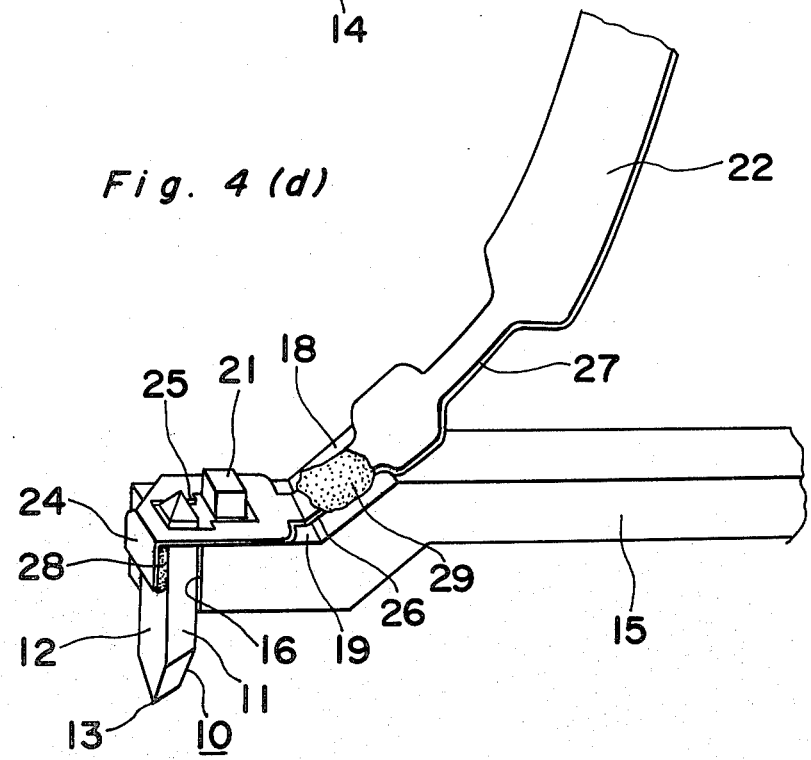
FIG. 4(d) is a perspective view, on a somewhat enlarged scale, of the essential portion of the stylus carrier embodying the present invention.

Referring now to FIGS. 4 to 6, the stylus, the stylus carrier and the fly lead, all referred to in connection with the prior art pick-up assembly, are generally identified by 10, 15 and 22, respectively. The stylus 10 used in the present invention is made of a diamond and has a generally square cross-sectioned body 11 having two planes each disposed opposite to the other and a generally wedge-shaped point 13 so shaped as to have a ridge engageable lengthwisely in a groove on a video disc (not shown) moving in a direction, shown by the arrow 14 in FIG. 4(c), relative thereto. Although not shown, one side face 12 (FIG. 4(d)) of the stylus 10 facing in a direction away from the stylus carrier 15 is provided with an electrode layer for converting the oscillations of the stylus in the disc groove into a electrical signal. The stylus carrier 15 used in the present invention is made of a synthetic resin and is molded in the form of a generally elongated bar of generally square cross-sectional shape. As best shown in FIG. 5(a) to FIG. 5(c), the stylus carrier 15 has a free end partially inwardly recessed to provide upright support faces 16 and 17 which lie at right angles to each other and extends in a direction generally perpendicular to the longitudinal axis of the carrier 15. This stylus carrier 15 also has an inclined support face 18, inclined downwardly towards the support faces 16 and 17, and a flat support face 19 positioned on one side of the carrier 15 opposite to the video disc (not shown) and continued to the inclined support face 18. While the function of each of these support faces 16 to 18 will be described later, the carrier 15 is provided, or otherwise formed integrally, with a generally square cross-sectional projection 21 protruding upwards from the flat support face 19 at right angles thereto and in a direction opposite from the video disc to be situated beneath the carrier 15, said projection 21 being positioned with one side surface 20 flush with the upright support face 16. On one side opposite to the inclined support face 18, the carrier 15 has a reinforcement rib 30 formed integrally therewith an shown in FIG. 4(c).

Figure 1:
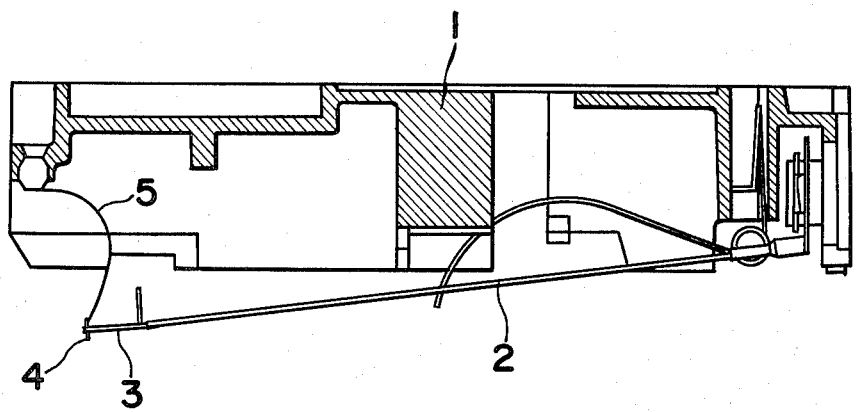
FIG. 1 is a side sectional view of the prior art pick-up assembly.
Figure 2:
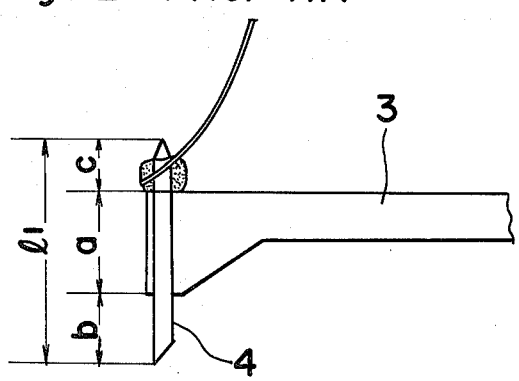
FIG. 2 is a schematic side view, on an enlarged scale, of an essential portion of a stylus carrier in the prior art pick-up assembly, showing the manner by which the stylus is connected to the fly lead.

As is the case with the conventional stylus carrier, the stylus carrier 15 has the other end (not shown) adapted to be connected to and supported by the known cantilever shown by 2 in FIG. 1.

The fly lead 22 is in the form of an electroconductive and resilient strip made of, for example, beryllium copper and is so shaped, as best shown in FIG. 6, as to have a contact end 24, bent along the broken line 23 so that, in an assembled condition shown in FIG. 4(d), it contacts to and bridges the stylus 11 and the free end face of the carrier 15, a cutout 25 which in the assembled condition permits both the projection 21 and, if any, the upper end of the stylus 11 opposite to the point 13 to extend loosely therethrough, and first and second spaced constricted areas 26 and 27.

The stylus 11 is secured to the carrier 15 by the use of a bonding agent in the form as received in a space defined between the support faces 16 and 17 with which related side faces of the stylus 11 are held in contact. While the stylus 11 is so supported as hereinabove described, the fly lead 22 is mounted on the carrier 15 in such a manner that the contact end 24 thereof is physically and electrically connected to the electrode layer on the side face 12 of the stylus 11 by the use of an electroconductive bonding agent, the deposit of which bonding agent is shown by 28 in FIGS. 4(a) to 4(c), with the perforated area of said fly lead 22 held in contact with the flat support face 19. With the fly lead 22 so mounted on the carrier 15, the first constricted area 26 on one side of the perforated area opposite to the contact end 24 is physically fixed to the inclined support face 18 by a deposit 29 of any suitable bonding agent, the remaining portion, including the second constricted area 27, of the fly lead 22 being permitted to extend upwardly curvedly away from the carrier 15. While the second constricted area 27 is provided for the purpose of giving a compliance relative to a lateral displacement of the pick-up in a direction generally transversely of the disc groove, the other end of the fly lead 22 remote from the carrier is not only connected electrically within a known electrical circuit inside the casing, shown by 1 in FIG. 1, but also physically connected to the casing so as to give a compliance relative to the carrier 15 to urge the stylus 11 towards the video disc as is well known to those skilled in the art.

According to the present invention, those skilled in the art can readily appreciate the following features.

(1) Since the upper end of the stylus 11 need not be always project upwardly beyond the level of the flat support face 19 of the carrier, the required length of the diamond stylus can advantageously be minimized and, therefore, the expenses required for acquiring the material for the stylus can also be minimized.

Figure 3:
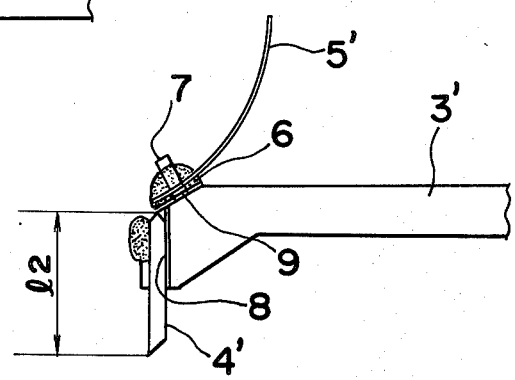
FIG. 3 is a view similar to FIG. 2, but according to another arrangement of the prior art.

(2) Since no electrodeposition such as required in the proposed arrangement of FIG. 3 is required, the cost of the stylus carrier can be minimized.

(3) Since the fly lead is provided with the cutout 25 not only for the purpose of positioning of the fly lead relative to the carrier 15 but also for permitting the end of the stylus, if it projects upwardly beyond the flat support face 19, to project loosely therethrough, any of diamond styluses of varying length within, for example, the range of 0.8 to 1.2 mm, can be employed without the selection of a precisely dimensioned one from them.

(4) Where the cutout in the perforated area of the fly lead is shaped in complemental relation to the cross-sectional representation of the projection 21, one of the cutouts in the fly lead and the projection will serve as a guide for the other and, therefore, the mounting of the fly lead on the carrier can readily be done within a very narrow tolerance.

Although the present invention has fully been described in connection with the preferred embodiment thereof with reference to the accompanying drawings, it is to be noted that various changes and modifications are apparent to those skilled in the art. Such changes and modifications, unless they depart from the spirit and scope of the present invention, are to be construed as included therein.

What is claimed is:

1. A pick-up assembly which comprises, in combination:
   a generally square cross-sectional elongated stylus having first and second planar surfaces disposed opposite to and generally parallel to each other, and having an electrode provided on said first planar surface of said stylus so as to extend lengthwise thereof;
   a generally elongated stylus carrier having first and second support faces formed at one end thereof so as to lie at right angles to each other, said stylus having said second planar surface and one adjacent surface secured to said first and second support faces so as to position said first planar surface of said stylus to face in a direction away from said carrier, said stylus so secured extending generally transversely of the longitudinal axis of the carrier; and
   a generally strip-shaped resilient fly lead having one end bent to protrude generally perpendicular to the remaining portion thereof so as to form a lateral plane surface parallel to said first planar surface of said stylus, said bent end being physically and electrically connected to said electrode.

2. An assembly as claimed in claim 1, wherein a portion of the fly lead adjacent the bent end has a perforation defined therein and wherein said stylus carrier has a projection protruding outwardly therefrom in flush with said second support face, said projection extending through said perforation.

3. An assembly as claimed in claim 2, wherein another portion of the fly lead on one side of the perforation opposite to the bent end is constricted in width and wherein a portion of the stylus carrier on one side of the projection opposite to any one of the first and second support faces is sloped to incline downwards towards the projection, said another portion of said fly lead being bonded to said sloped portion of the carrier.

4. The method of assembling a pickup assembly comprising a stylus, a stylus carrier, and a fly lead, comprising the steps of:
   forming an electrode on one surface of said stylus;
   physically bonding said stylus to said stylus carrier so as to position said electrode away from said carrier;
   bending one end of said fly lead to protrude generally perpendicularly to the adjacent portion of said fly lead;
   physically and electrically bonding said bent end of said fly lead to said electrode; and
   physically bonding an adjacent portion of said fly lead to said stylus carrier.

5. A pickup assembly comprising a stylus, a stylus carrier, and a fly lead, said stylus having two generally parallel opposed planar surfaces and having an electrode formed on one of said surfaces and having the other surface bonded to said stylus carrier, said fly lead being generally strip-shaped with one end bent at right angles to the remainder, said bent end being physically and electrically bonded to said electrode and a portion adjacent to said bent end being physically bonded to said stylus carrier.

* * * * *